US008413784B2

(12) United States Patent
Giefer et al.

(10) Patent No.: US 8,413,784 B2
(45) Date of Patent: Apr. 9, 2013

(54) OPERATING DEVICE FOR A VEHICLE HAVING AN AUTOMATIC TRANSMISSION AND AN ELECTRICALLY ACTUATED PARKING BRAKE SYSTEM

(75) Inventors: Andreas Giefer, Lemforde (DE); Jorg Meyer, Wagenfeld (DE); Ludger Rake, Diepholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 12/597,023

(22) PCT Filed: Mar. 5, 2008

(86) PCT No.: PCT/DE2008/000382
§ 371 (c)(1),
(2), (4) Date: Oct. 22, 2009

(87) PCT Pub. No.: WO2008/135003
PCT Pub. Date: Nov. 13, 2008

(65) Prior Publication Data
US 2010/0326787 A1    Dec. 30, 2010

(30) Foreign Application Priority Data

May 7, 2007   (DE) .......................... 10 2007 021 831

(51) Int. Cl.
  *F16D 65/14*   (2006.01)
  *F16D 65/34*   (2006.01)
(52) U.S. Cl. .................................. 192/219.4; 192/219.6
(58) Field of Classification Search ............... 192/219.4, 192/219.6
See application file for complete search history.

(56) References Cited

U.S. PATENT DOCUMENTS

| 5,139,315 | A | * | 8/1992 | Walenty et al. | 303/162 |
| 5,156,243 | A | * | 10/1992 | Aoki et al. | 192/218 |
| 5,696,679 | A | * | 12/1997 | Marshall et al. | 701/53 |
| 5,706,703 | A | * | 1/1998 | Kim | 74/473.24 |
| 6,256,568 | B1 | | 7/2001 | Siepker et al. | |
| 6,588,290 | B2 | * | 7/2003 | Wilson et al. | 74/335 |
| 7,921,746 | B2 | * | 4/2011 | Giefer et al. | 74/473.23 |
| 8,037,972 | B2 | * | 10/2011 | Fujita | 188/31 |
| 8,336,418 | B2 | * | 12/2012 | Giefer et al. | 74/473.23 |
| 2004/0140710 | A1 | * | 7/2004 | Alvarez et al. | 303/20 |
| 2006/0197374 | A1 | * | 9/2006 | Jez | 303/20 |

FOREIGN PATENT DOCUMENTS

| DE | 196 10 766 A1 | 9/1997 |
| DE | 199 41 018 A1 | 3/2001 |
| DE | 199 55 016 A1 | 5/2001 |
| DE | 10 2005 005 669 A1 | 8/2006 |

(Continued)

*Primary Examiner* — David D Le
*Assistant Examiner* — Jacob S Scott
(74) *Attorney, Agent, or Firm* — Davis & Bujold, PLLC

(57) ABSTRACT

An operating device for a vehicle with an automated transmission and an electrically actuated parking brake system. The device includes a mechanical actuating element for inputting operating commands from the user and a control unit for converting the operating commands into control signals for the transmission and the parking brake system. The actuating element has at least first and second successive stable positions, a neutral position and a return position. In the first stable position, an operating command is generated for the parking brake system to actuate the parking brake device and, in the second stable position, an operating command is generated for the transmission to actuate the parking lock device. The actuating element combines two different actuating elements into an operating device which enables the driver to choose whether, besides activation of the parking brake system, he wishes to additionally engage the parking lock system associated with the transmission.

14 Claims, 1 Drawing Sheet

FOREIGN PATENT DOCUMENTS

| | | |
|---|---|---|
| DE | 10 2005 048 875 A1 | 4/2007 |
| EP | 0 972 667 A1 | 1/2000 |
| WO | 2006/084544 A2 | 8/2006 |

* cited by examiner

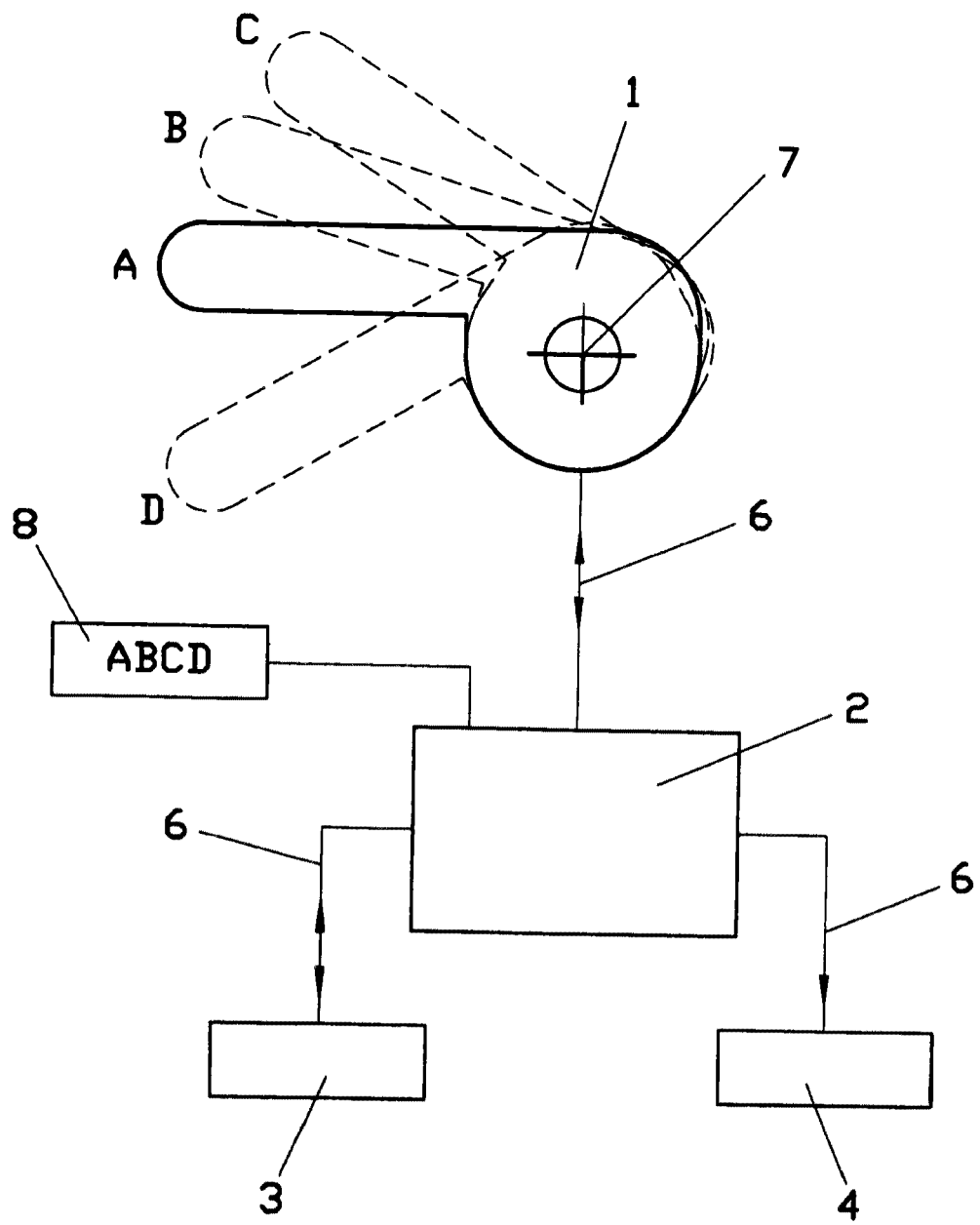

OPERATING DEVICE FOR A VEHICLE HAVING AN AUTOMATIC TRANSMISSION AND AN ELECTRICALLY ACTUATED PARKING BRAKE SYSTEM

This application is a National Stage completion of PCT/DE2008/000382 filed Mar. 5, 2008, which claims priority from German patent application serial no. 10 2007 021 831.3 filed May 7, 2007.

TECHNICAL FIELD

The invention concerns an operating device for a vehicle with an automated transmission and an electrically actuated parking brake system, comprising of at least one mechanical actuating element for the input of operating commands by the user of the vehicle and a control unit for converting the operating commands into control signals for the transmission and the parking brake system.

PRIOR ART

The operating device of the type concerned mentioned above is used in various versions in vehicles with an automated transmission and an electrically actuated parking brake system. The operating device as a rule comprises of two separate actuating switches or the like, and serves to enable a vehicle to be parked safely in accordance with the user's wishes.

In principle, in vehicles equipped as described above there are two different possibilities of ensuring that once the vehicle has been parked, it will not roll away.

On the one hand, in vehicles with an automated transmission, where this type of transmission is understood to mean both a semi-automatic transmission with manual gear selection and automatic clutch actuation and also a fully automatic transmission, the transmissions used are provided with a so-termed parking lock device. As a rule the parking lock device engages mechanically in the transmission by means of a locking device suitable for the purpose, which can for example be made as a locking pawl, and thereby prevents the vehicle from rolling away.

In vehicles whose transmission is actuated by a shift-by-wire mechanism, the parking lock can be actuated electrically, hydraulically or pneumatically. For that purpose the vehicle's user is enabled, for example by means of a push-button or a lever, to activate the parking lock independently once the vehicle has been parked. Furthermore, it is also possible for the parking lock in the transmission to be engaged automatically as soon as the vehicle's user switches off the ignition, withdraws the ignition key or leaves the vehicle.

Besides mechanically locking the automated or automatic transmission, each vehicle has a parking brake system which in the present state of the art is often actuated electrically, which can supplement the ordinary working brake system, in the first place to prevent undesired rolling away when the vehicle is at rest and, at the same time, during operation of the vehicle, to act as an emergency braking system for example if the working brake system should fail. Like the above-mentioned parking lock, such an electrically actuated parking brake system is often also operated by means of a button or switch.

Because of the circumstances, when both systems are present vehicle users often find themselves uncertain about the need for and actuation of both the parking lock and the parking brake system. For one thing, this is often because the respective operating elements are marked with symbols of very similar design, so that for the vehicle's user it is at the same time difficult to distinguish between the individual functions of the systems.

Legal requirements, which specify that it is compulsory to have both a parking lock and a parking brake system, are often unknown to the vehicle's user.

OBJECTIVE

Accordingly, the purpose of the present invention, starting from the drawbacks outlined above in relation to the operability and function of the different safety systems integrated in the vehicle to prevent rolling away of the vehicle, is to provide an operating device of the type indicated earlier which will enable the vehicle's user, intuitively, to use the different safety systems according to his individual needs.

SOLUTION

According to the invention this objective is achieved if the actuating element of the operating device has at least two successive stable positions, as well as a neutral position and a return position, such that in the first stable position an operating command is generated for the parking brake system for actuating the parking brake device, and in the second stable position an operating command is generated for the transmission for actuating the parking lock device.

Thus, the special design of the actuating element combines two actuating elements previously different and as a rule also spatially separate within the vehicle, into a conjoint operating device, so that the vehicle's user now has the choice, without problems and intuitively, whether besides the routine actuation of the electrically actuated parking brake system, he wishes in addition to engage the parking lock device associated with the automated or automatic transmission.

In particular it has been found advantageous for the control unit to comprise a checking module, which only transmits the operating commands of the actuating element to the transmission and the parking brake system when the vehicle is at rest, whereas when the vehicle is moving it passes on the operating command for the parking brake device as an emergency braking command to the brake system of the vehicle in order to actuate it. This further development according to the invention on the one hand ensures that the parking brake system can only be activated in cases when it is needed, and at the same time that the emergency brake function required by law can also be guaranteed. At the same time, the checking module ensures that if the vehicle is rolling at a speed in excess of a limit speed (for example 3 km/h), the parking lock cannot be engaged.

Moreover, in another expedient design of the object of the invention the actuating element can be an operating lever whose stable positions, neutral position and return position all lie in a common positional and movement plane. For the vehicle's user the common positional plane facilitates the intuitive actuation of the operating device and improves the ergonomic boundary conditions of the vehicle's use. It is also an advantage for the plane to be arranged substantially vertically, since the actuating element can then be moved by the vehicle's user by a pushing or pulling motion. Alternatively, a horizontal arrangement of the positional plane is of course also conceivable.

Furthermore, it can be advantageous for the actuating element to comprise a restoring device for automatically restoring the actuating element from all the stable positions and the return position back to the neutral position. In this case the neutral position is a central position from which all the other positions can easily be reached, such that the stable positions can be designed as actuating positions reached from the neutral position by pulling the actuating element upward and the return position can be reached from the neutral position by pushing the actuating element downward in the opposite direction.

For certain applications, however, it can also be advantageous for the actuating element to comprise at least one positioning device for fixing the actuating element in one or more of the stable positions. This position-fixing in one or more stable positions and if needs be in the return position as well can make it clear to the vehicle's user, at a glance, whether the electronic parking brake or the parking lock of the transmission is engaged, or perhaps by the positioning of the actuating element in the return position, that neither of the above vehicle elements is engaged.

If the actuating element is not provided with a positioning device for fixing the position of the actuating element in one of the stable positions or possibly in the return position, then alternatively, if a mechanism for always returning the actuating element to its neutral position is used, the operating device can be provided with indicator means for visualizing the stable positions.

In this way, likewise, engagement of the parking lock or actuation of the electric parking brake system is indicated to the vehicle's user.

As a supplement, an expedient further development of the object of the invention provides that the actuating element comprises a drive device which, as a function of control pulses from the control unit, moves the actuating element to one of the stable positions. This is envisaged mainly for cases when on the one hand the actuating element should indicate the engagement of the parking lock in the transmission, and at the same time the vehicle is provided with a so-termed Auto-P function.

The Auto-P function ensures that when the vehicle has been parked and possibly also when the ignition key has been withdrawn or the user has left the vehicle, the parking lock function of the transmission is automatically activated. In such a case, when the parking lock has been engaged, the drive device moves the actuating element by means of special control pulses to the position of the actuating element that corresponds to the engagement of the parking lock.

Furthermore, the checking module associated with the control element can of course serve for other logical relationships between various vehicle conditions, to ensure the intuitive and error-free operability of the operating device according to the invention.

DESCRIPTION OF THE DRAWING

Below, the object of the invention is explained in more detail with reference to the attached drawing, which illustrates purely schematically structural elements of the vehicle which are relevant for the invention and the device according to the invention and its relationships, with the help of a block diagram.

Example Embodiment

The operating device according to the invention comprises an actuating element 1 designed as an operating lever, which can pivot as a hand-lever about a pivoting point 7 in a vertical movement plane. In the movement plane there are various switch positions which are associated with specific operation commands, so that the operation commands, which are generated when the vehicle's user actuates the operating lever, are delivered to a control unit 2 via a data line 6. In the control unit 2 these operating commands are then converted to control signals and passed on to the transmission 3 and the parking brake system 4 present in the vehicle, again via corresponding data lines 6.

In its movement plane the actuating element 1 has various switch positions marked by the letters A, B, C and D. Position A is the so-termed neutral position, in which the actuating element 1 is always located when no input commands are given by the vehicle's user concerning the use of the parking brake system or the parking lock.

Next to the neutral position A and upward, are the stable positions B and C. The actuating element can be moved to positions B and C, which are stable in the sense that having moved there, it remains in them. Alternatively it is possible for the actuating element to be provided with a restoring device, for example in the form of a spring mechanism, so that when the operating lever has been released the actuating element 1 automatically moves out of the two stable positions B and C and returns to the neutral position A. In such a case a so-termed monostable design would be chosen for the actuating element 1.

In both design variants the result of moving the actuating element 1 to stable position B is that a corresponding operating command of the vehicle's user is sent to the control unit 2, which generates and transmits a control signal for the parking brake system 4 in the vehicle. This control command leads to activation of the electrically actuated parking brake system 4 and at the same time it can be checked in the control unit 2 whether the status of the vehicle is appropriate for the parking brake system 4 to be actuated.

If the vehicle's user changes the position of the actuating element 1 while the vehicle is moving, then just as in the above-described case when the vehicle is at rest an operating command is sent to the control unit 2, but at the same time the control unit 2 emits a control signal which activates the emergency braking system. Advantageously, the emergency braking system and the parking brake system 4 can be structurally combined in the vehicle. Depending on the vehicle, corresponding design details have to be established for the design of the working brake system, the parking brake system 4 and the emergency braking system.

If the actuating element 1 is moved beyond stable position B and into stable position C, an operating command is sent via the data line 6 to the control unit 2 such that, if necessary after checking other vehicle boundary conditions, the parking lock of the transmission 3 is activated. Such boundary conditions can for example be the rolling status of the vehicle, since engagement of the parking lock in the transmission 3 when the vehicle is rolling at a speed in excess of a certain limit must be excluded. Indeed, the checking module present in the actual unit, which already provides for different actuation of the emergency braking and the parking brake systems, can also be used when the actuating element 1 is moved to stable position C, to prevent erroneous operation and consequent damage to components of the vehicle. Thus, when the vehicle is rolling at a speed above the limit speed, stable position C is only active, like stable position B, in relation to the emergency braking function and otherwise has no function. It should be borne in mind that in stable position C both the parking brake system and the parking lock in the transmission are active, since stable position C is reached by first moving through stable position B (which results in the activation of the parking brake system).

If, corresponding to a design variant, the operating device is provided with a restoring mechanism for automatically returning the actuating element 1 from stable positions B and C to the neutral position A, then it is advantageous to indicate to the vehicle's user visually that the parking brake system 4 and/or the parking lock is/are engaged, by means of a display device 8. For this purpose a suitable position on the instrument panel can be used for a corresponding display.

If the vehicle's user wishes to disengage the parking lock or deactivate the parking brake system 4, then for that purpose the actuating element 1 has another, so-termed return position D which, starting from the neutral position A of the actuating element 1, is located under the latter, as can be seen from the schematic representation in the drawing.

The parking lock and if necessary the parking brake system can also be deactivated by engaging a drive range in the transmission.

If the actuating element has a restoring device, then it is also returned automatically to its neutral position A again from the return position D. If the actuating element 1 does not have a restoring device, then after being moved to positions B, C or D it will remain in that respective stable position or the neutral position, so that the vehicle's user can see immediately whether the parking brake system or the parking lock are active or whether neither of the two is active. In such a case, if the vehicle has a so-termed Auto-P device, the actuating element 1 can be provided with additional drive means which serve to move the actuating element 1 automatically from positions A or B or D to the stable position C. This must always happen when, after parking the vehicle, the vehicle's user withdraws the ignition key or leaves the vehicle, whereby in those cases the Auto-P function causes the parking lock in the transmission to be engaged automatically.

Of course, the operating system according to the invention for a vehicle with an automated transmission and an electrically actuated parking brake system is not limited to the design variants described above. Rather, the design according to the invention is intended to facilitate the vehicle's user in operating the various vehicle components—parking lock and parking brake system—and to exclude any erroneous operations. For that purpose the control unit 2 and the actuating element 1 can be provided with further individual components which, for example, allow supplementary vehicle boundary conditions to be taken into account in the logical sequence of operating and control commands.

LIST OF INDEXES

1 Actuating element
2 Control unit
3 Transmission
4 Parking brake system
6 Data lead
7 Pivot point
8 Display device
A Neutral position
B Stable position
C Stable position
D Return position

The invention claimed is:

1. An operating device for a vehicle with an automated transmission and an electrically actuated parking brake system, the device comprising:
at least one mechanical actuating element for inputting operating commands by a user of the vehicle, and
a control unit for converting the operating commands to control signals for the automated transmission and the parking brake system,
the actuating element (1) having at least first and second successive stable positions (B, C), a neutral position (A) and a return position (D) such that in the first stable position (B) an operating command is generated for the parking brake system (4) to actuate a parking brake device and, in the second stable position (C), an operating command is generated for the automated transmission to actuate a parking lock device, and
the actuating element (1) only actuating the parking braking device and the parking lock device of the vehicle.

2. The operating device according to claim 1, wherein the control unit (2) comprises a checking module which transmits the operating commands, of the actuating element (1), to the transmission and the parking brake system (4) only when the vehicle is not rolling, and when the vehicle is rolling below a limit speed, the control unit (2) transmits the operating command to an emergency braking system of the vehicle in order to actuate the emergency braking system.

3. The operating device according to claim 1, the actuating element (1) is an operating lever and the first and the second stable positions (B, C), the neutral position (A) and the return position (D) are all arranged in a common position plane.

4. The operating device according to claim 3, wherein the position plane is arranged substantially vertically.

5. The operating device according to claim 1, wherein the actuating element (1) comprises a restoring device for automatically restoring the actuating element (1) from the first and the second stable positions (B, C) and the return position (D) to the neutral position (A).

6. The operating device according to claim 1, wherein the actuating element (1) comprises at least one positioning device for fixing the actuating element (1) in one of the first and the second stable positions (B, C).

7. The operating device according to claim 6, wherein the actuating element (1) comprises a drive device which, as a function of control pulses emitted by the control unit (2), moves the actuating element (1) to the second stable position (C).

8. The operating device according to claim 1, wherein the operating device has a display means (8) for visualizing the first and the second stable positions (B, C).

9. The operating device according to claim 1, wherein the actuating element (1) only has a return position, a neutral position and the first and the second stable positions.

10. The operating device according to claim 1, wherein the actuating element (1) is unable to achieve any transmission gear shifting.

11. The operating device according to claim 1, wherein, when the actuating element (1) is in the neutral position, the actuating element (1) is located in a substantially horizontally orientation.

12. The operating device according to claim 11, wherein the first and the second stable positions are actuated by moving the actuating device vertically upward relative to the neutral position, and the return position is actuated by moving the actuating device vertically downward relative to the neutral position.

13. The operating device according to claim 1, wherein the first stable position is directly adjacent to the neutral position, and the first stable position is located between the second stable position and the neutral position so that a user must actuate the actuating element from the neutral position through the first stable position in order to reach the second stable position, and the neutral stable position is located between the first stable position and the return position so that a user must actuate the actuating element through the neutral position in order to reach the return position from both the first and the second stable positions.

14. An operating device for a vehicle having an automated transmission and an electrically actuated parking brake system, the device comprising:
- an actuating element being manually pivotable between four positions, a first operating command being generated and transmitted when the actuating element is in a first stable position (B), and a second operating command being generated and transmitted when the actuating element is in a second stable position (C), and the actuating element (1) only actuating a parking braking device and a transmission parking lock device of the vehicle;
- a control unit being connected, via a data line, to the actuating element such that the control unit receives, depending on a position of the actuating element, either the first or the second operating command from the actuating element,
  - the control unit converting the first operating command into a first control signal which is transmitted to the parking brake system (4) to activate the parking brake device; and
  - the control unit converting the second operating command into a second control signal which is transmitted to the transmission (3) to activate the transmission parking lock device.

* * * * *

UNITED STATES PATENT AND TRADEMARK OFFICE
CERTIFICATE OF CORRECTION

| | |
|---|---|
| PATENT NO. | : 8,413,784 B2 |
| APPLICATION NO. | : 12/597023 |
| DATED | : April 9, 2013 |
| INVENTOR(S) | : Andreas Giefer et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 536 days.

Signed and Sealed this
Twenty-fifth Day of June, 2013

Teresa Stanek Rea
*Acting Director of the United States Patent and Trademark Office*